United States Patent
Badea et al.

(10) Patent No.: US 9,219,667 B2
(45) Date of Patent: Dec. 22, 2015

(54) METHODS, SYSTEMS, AND COMPUTER READABLE MEDIA FOR SELECTIVELY PROCESSING PACKETS USING TIME TO LIVE (TTL) INFORMATION

(71) Applicant: Ixia, Calabasas, CA (US)

(72) Inventors: Alexandru R. Badea, Bucharest (RO); George Ciobanu, Town Vaslui (RO); Marius-Gabriel Ionescu, Ploiesti/Prahova (RO)

(73) Assignee: Ixia, Calabasas, CA (US)

( * ) Notice: Subject to any disclaimer, the term of this patent is extended or adjusted under 35 U.S.C. 154(b) by 302 days.

(21) Appl. No.: 13/860,523

(22) Filed: Apr. 10, 2013

(65) Prior Publication Data
US 2014/0269371 A1   Sep. 18, 2014

(30) Foreign Application Priority Data
Mar. 14, 2013   (RO) ............... A201300229

(51) Int. Cl.
*H04L 12/26* (2006.01)
*H04L 29/06* (2006.01)

(52) U.S. Cl.
CPC .......... *H04L 43/0858* (2013.01); *H04L 43/50* (2013.01); *H04L 63/0227* (2013.01); *H04L 63/1408* (2013.01); *H04L 43/028* (2013.01); *H04L 43/04* (2013.01); *H04L 63/0428* (2013.01)

(58) Field of Classification Search
CPC ...... H04L 43/10; H04L 43/50; H04L 12/2697
See application file for complete search history.

(56) References Cited

U.S. PATENT DOCUMENTS

| | | | |
|---|---|---|---|
| 7,596,097 B1 * | 9/2009 | McCowan et al. | 370/248 |
| 2005/0207410 A1 * | 9/2005 | Adhikari et al. | 370/389 |

OTHER PUBLICATIONS

"Time to Live," Wikepedia, pp. 1-4 (Last Modified Mar. 7, 2013).
"Building VPNs on OpenBSD," www.kernel-panic.it/openbsd/vpn/vpn2.html, pp. 1-5 (Mar. 4, 2013).
Rescorla et al., "Datagram Transport Layer Security Version 1.2," Network Working Group, RFC 6347, pp. 1-33 (Jan. 2012).
Kent, "IP Encapsulating Security Payload (ESP)," Network Working Group, RFC 4303, pp. 1-45 (Dec. 2005).
Huttunen et al., "UDP Encapsulation of IPsec ESP Packets," Network Working Group, RFC 3948, pp. 1-16 (Jan. 2005).
"Internet Protocol," DARPA Internet Program Protocol Specification, RFC 791, pp. 1-49 (Sep. 1981).

* cited by examiner

*Primary Examiner* — Jung Park
(74) *Attorney, Agent, or Firm* — Jenkins, Wilson, Taylor & Hunt, P.A.

(57) ABSTRACT

Methods, systems, and computer readable media for selectively processing packets using time to live (TTL) information are disclosed. A method for selectively processing packets using TTL information includes receiving, at a test system, a test packet from a device under test (DUT), wherein the test packet includes a TTL parameter field containing a TTL value. The method further includes determining if the TTL value in the test packet is a magic TTL value and performing a processing task on the test packet if the test packet includes the magic TTL value.

25 Claims, 6 Drawing Sheets

METHODS, SYSTEMS, AND COMPUTER READABLE MEDIA FOR SELECTIVELY PROCESSING PACKETS USING TIME TO LIVE (TTL) INFORMATION

PRIORITY CLAIM

This application claims the benefit of Romanian Patent Application No. A201300229, filed Mar. 14, 2013; the disclosure of which is incorporated herein by reference in its entirety.

TECHNICAL FIELD

The subject matter described herein relates to processing of packets for testing the performance of computer network equipment. More specifically, the subject matter relates to methods, systems, and computer readable media for selectively processing packets using time to live (TTL) information.

BACKGROUND

In network equipment performance testing environments, it may be desirable to generate traffic that is stateless, encrypted, and/or encapsulated. In some testing environments, a test packet originator of a test system generates a stream of cleartext stateless packets, such as user datagram protocol (UDP) packets, and then utilizing encapsulating security payload (ESP) protocol to apply encryption and encapsulation to each test packet. Ultimately, after being received by a device under test (DUT), the test packets are returned to the test system and may subsequently be processed (e.g., decrypted, filtered, etc.) by a final test packet receiver. Due to performance penalties, however, the test packet receiver of the test system should not be configured to process all of the incoming packets in the case of stateless test packet traffic (unless configured otherwise). For example, if the test system is required to decrypt each and every received test packet, the processing resources necessary to perform such global test packet decryption would prove computationally burdensome. Such a configuration potentially leads to reduced overall test system bandwidth capability and more costly test system hardware. As networks handle greater volumes of traffic and network devices increase in performance, so too must testing equipment keep pace in order to accurately test the performance of emerging networks and network equipment.

Accordingly, in light of these difficulties, a need exists for improved methods, systems, and computer readable media for selectively processing packets using TTL information.

SUMMARY

Methods, systems, and computer readable media for selectively processing packets using time to live (TTL) information are disclosed. A method for selectively processing packets using TTL information includes receiving, at a test system, a test packet from a device under test (DUT), wherein the test packet includes a TTL parameter field containing a TTL value. The method further includes determining if the TTL value in the test packet is a magic TTL value and performing a processing task on the test packet if the test packet includes the magic TTL value.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for selectively processing packets using time to live (TTL) information. As a packet traverses a network from the point of origin to a destination, intermediate network nodes (e.g., routers) forwarding the packet toward the destination are configured to decrement the TTL value in the packet by one. In the event the TTL value in the packet reaches zero (0) before the packet arrives at its intended destination, the packet is discarded and an error message is sent back to the sender. Specifically, a TTL parameter value is included in a packet in order to avoid a situation in which an undeliverable packet circulates on a network indefinitely. In most networks, IP packets are assigned and/or hardcoded with a recommended TTL value, such as 32 or 64. However, since the present subject matter is performed in a testing environment that includes a known number of nodes (e.g., a test system node and one or more DUTs), the TTL parameter field is not needed for its original intended purpose. Accordingly, the present subject matter may be configured to utilize the TTL parameter field in a packet to contain a magic TTL value that can be used to selectively identify a subset of all test packets that should be decrypted or processed by the test packet receiver of the test system. In some embodiments, the magic TTL value may be selected such that regardless of the number of nodes the test packet traverses, the final TTL value (e.g., the TTL value contained in the packet upon being received by the test system) either matches a specific predefined value (i.e., a magic TTL value) or is within a predefined range or interval (e.g., between a minimum magic TTL value and a maximum magic TTL value). At the same time, the magic TTL range or interval should be assigned with values that distinguish the magic TTL value from a normal TTL value. For example, the magic TTL value may be set to value that largely exceeds the number of nodes in the test network.

Figure 1:
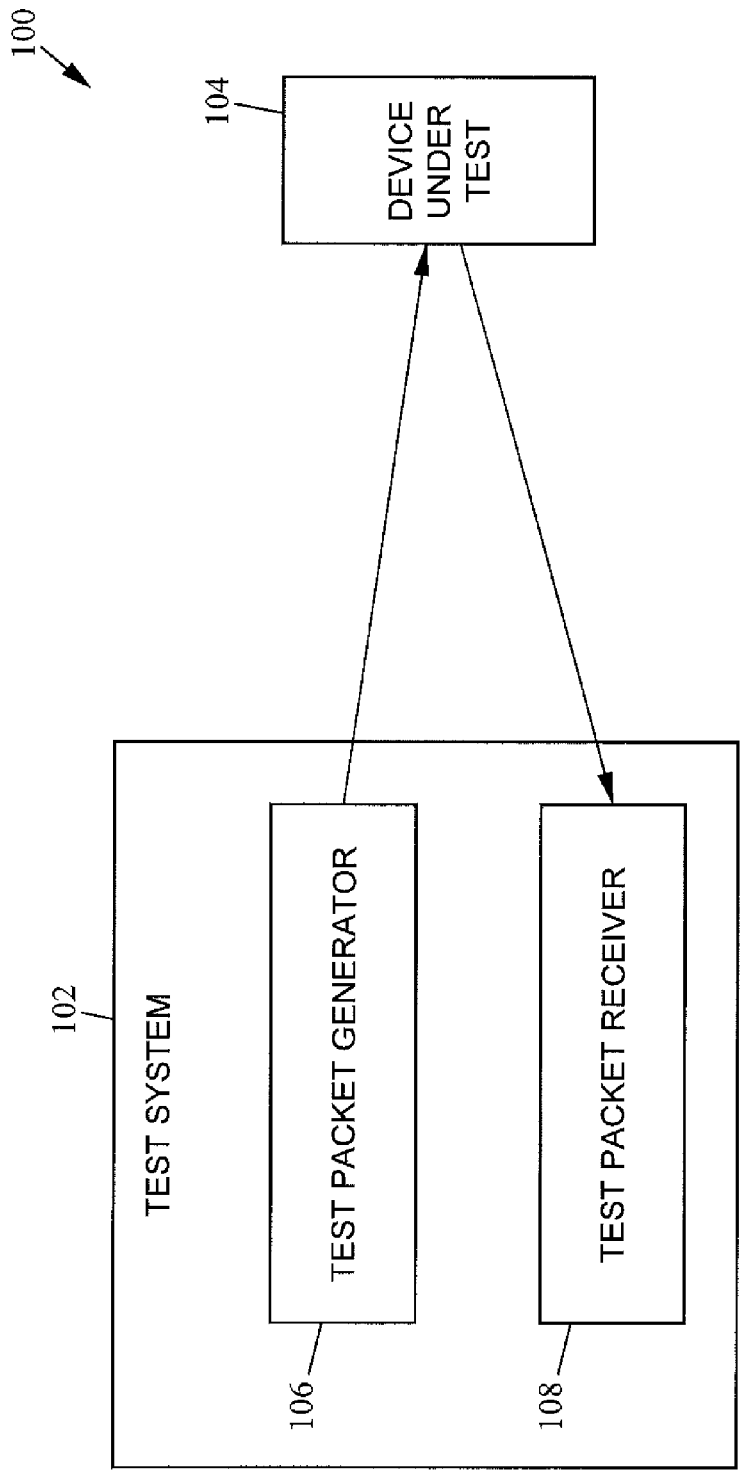
FIG. 1 is a block diagram of an exemplary testing environment for selectively processing packets using time to live (TTL) information according to an embodiment of the subject matter described herein.

FIG. 1 is a block diagram of an exemplary system for selectively processing packets using TTL information according to an embodiment of the subject matter described herein. In FIG. 1, testing environment 100 includes a test system 102 and a device under test (DUT) 104. Device under test 104 may include, but is not limited to, networking hardware equipment such as an evolved packet system (EPS) network element, a network switch, a network router, an application server (AS), a user equipment (UE) device, a data center node, a WiFi access point, a modem, a firewall, a network address translation (NAT) routing device, or the like. Test system 102 may comprise a testing node, machine or computer that includes a test packet generator 106 and a test packet receiver 108. In some embodiments, test packet generator 106 may include a module that is configured to generate and transmit one or more test packets to DUT 104 via a wired or wireless connection. Similarly, test packet receiver 108 may include a module that is configured to receive reply packets and/or original test packets transmitted from DUT 104. Test packet receiver 108 may also be configured to selectively decrypt incoming packets received from DUT 104. For example, with respect to tests involving stateless traffic, test packet receiver 108 should not decrypt all incoming packets unless the device is explicitly configured to do because of the associated performance penalties.

In some embodiments, the test packets generated and received by test system 102 includes user datagram protocol (UDP) packets, transmission control protocol (TCP) packets, long term evolution (LTE) user equipment (UE) user plane packets, and the like. Similarly, the packets handled by test system 102 may include control plane communication packets, such as 3GPP S1-C signaling packets, evolved packet core (EPC) control signaling packets. In some embodiments, the test packets and control signaling may be transported using Internet protocol (IP).

In some embodiments, test packet generator 106 in test system 102 may include an encryption module configured to encrypt the test packets using any one of a plurality of encryption protocols. Exemplary encryption protocols that may be utilized by test packet generator 106 may include, but not limited to, Encapsulating Security Payload (ESP) protocol, Transport Layer Security (TLS) protocol, Data TLS (DTLS) protocol, Secure Shell (SSH) protocol, and the like. Similarly, test packet generator 106 may include an encapsulation module configured to encapsulate the test packets using any one of a plurality of encapsulation protocols. Exemplary encapsulation protocols that may be utilized by test system 102 may include, but not limited to, GPRS tunneling protocol (GTP), Point-to-Point Tunneling protocol (PPTP), Layer Two Tunneling protocol (L2TP), Secure Socket Tunneling protocol (SSTP), and Generic Routing Encapsulation (GRE) protocol, and the like.

Within certain types of IP test packets (e.g., IPv4 packets), a TTL parameter field contained in the header portion may be set to a pre-determined magic TTL value that is recognized by test system 102, but does not interfere with the processing performed by the DUT (e.g., DUT 104) that receives the test packet. Notably, test packet generator 106 may be configured to include a magic TTL value in one or more TTL parameter fields in a test packet. This aspect is described in greater detail with respect to FIG. 2. In some embodiments where an IP test packet is not encapsulated prior to transmission to a DUT from the test system, the IP header including a magic TTL value is also not encrypted. Although the following description discloses the use of a TTL parameter field, other similar parameter fields (e.g., hop limit field in IPv6) may be utilized without departing from the scope of the present subject matter.

Figure 2:
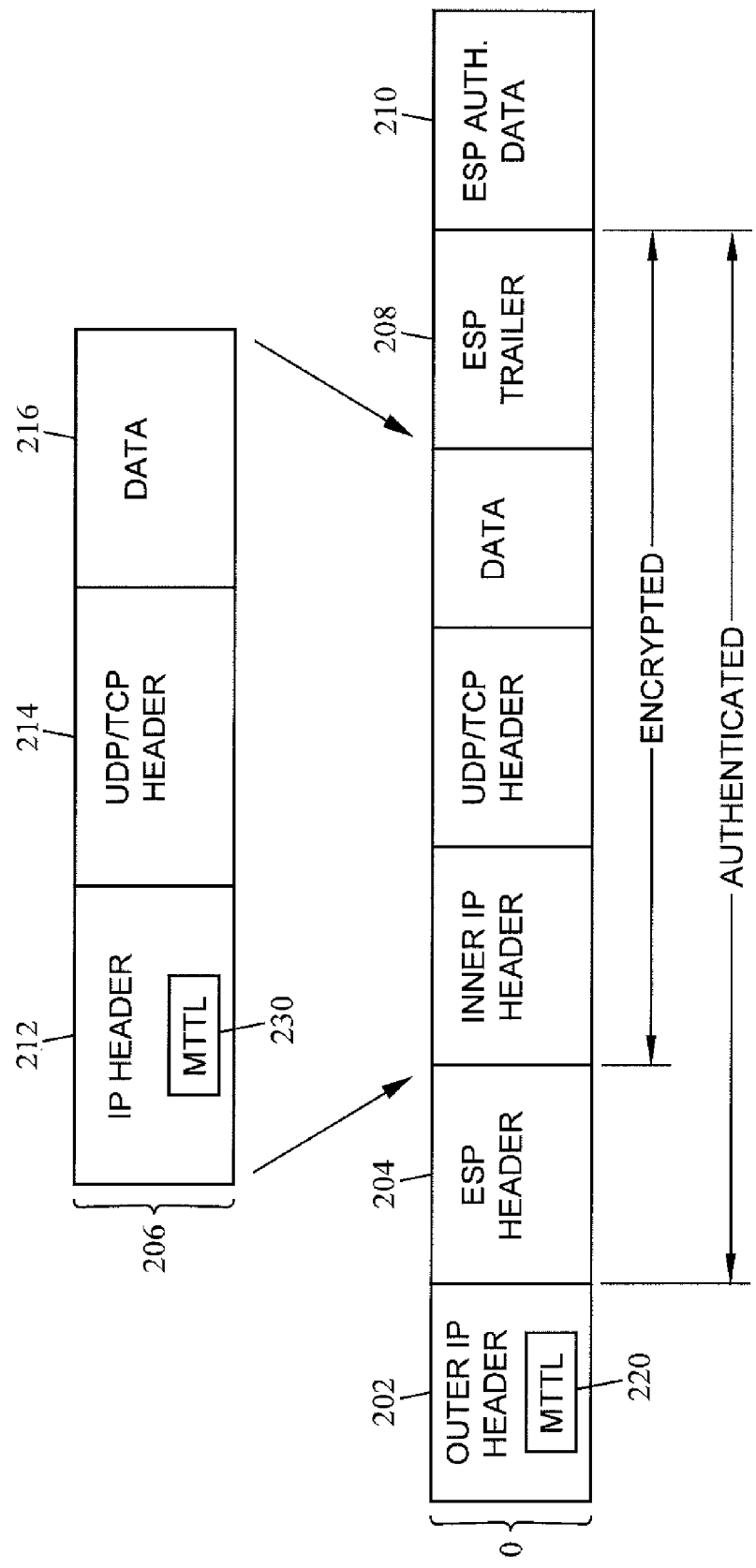
FIG. 2 is a block diagram illustrating an encapsulating security packet containing a magic time to live (TTL) value according to an embodiment of the subject matter described herein.

In some embodiments that include a testing environment where a test packet is encapsulated prior to transmission from test system 102, the IP header within an encapsulated IP test packet that includes a magic TTL value may be encrypted. For example, FIG. 2 illustrates an encapsulating IP packet 200 (e.g., an outer IP packet) that includes a header portion 202 (i.e., an outer IP header) and a payload portion. The payload of encapsulating packet 200 may include an ESP header 204, an encrypted (and encapsulated) payload, an ESP trailer portion 208, and an ESP authentication data portion 210. The encrypted payload of test packet 200 comprises an encrypted packet 206 (e.g., an inner packet). Encrypted packet 206 may include a header portion 212 (i.e., inner IP header), a UDP/TCP header portion 214, and a payload data portion 216. Notably, header portion 212 may be configured to include a magic TTL value 230. As used herein, the term "magic TTL value" is a value that test packet receiver 108 will recognize as indicating that the test packet requires further processing such as decryption. In one embodiment, the magic TTL value 230 is inserted in the inner packet header 212 by test packet generator 106 (e.g., shown in FIG. 1). Similarly, a magic TTL value 220 may be included in outer IP header 202. In some embodiments, magic TTL value 220 and magic TTL value 230 may match in value. In some embodiments, magic TTL value 220 and magic TTL value 230 may differ in value. By including a magic TTL value in both the inner and outer headers, test system 102 ensures that the test packet received from DUT 104 includes a magic TTL value (i.e., DUT 104 may strip the outer header of a received test packet in some instances).

Figure 3:
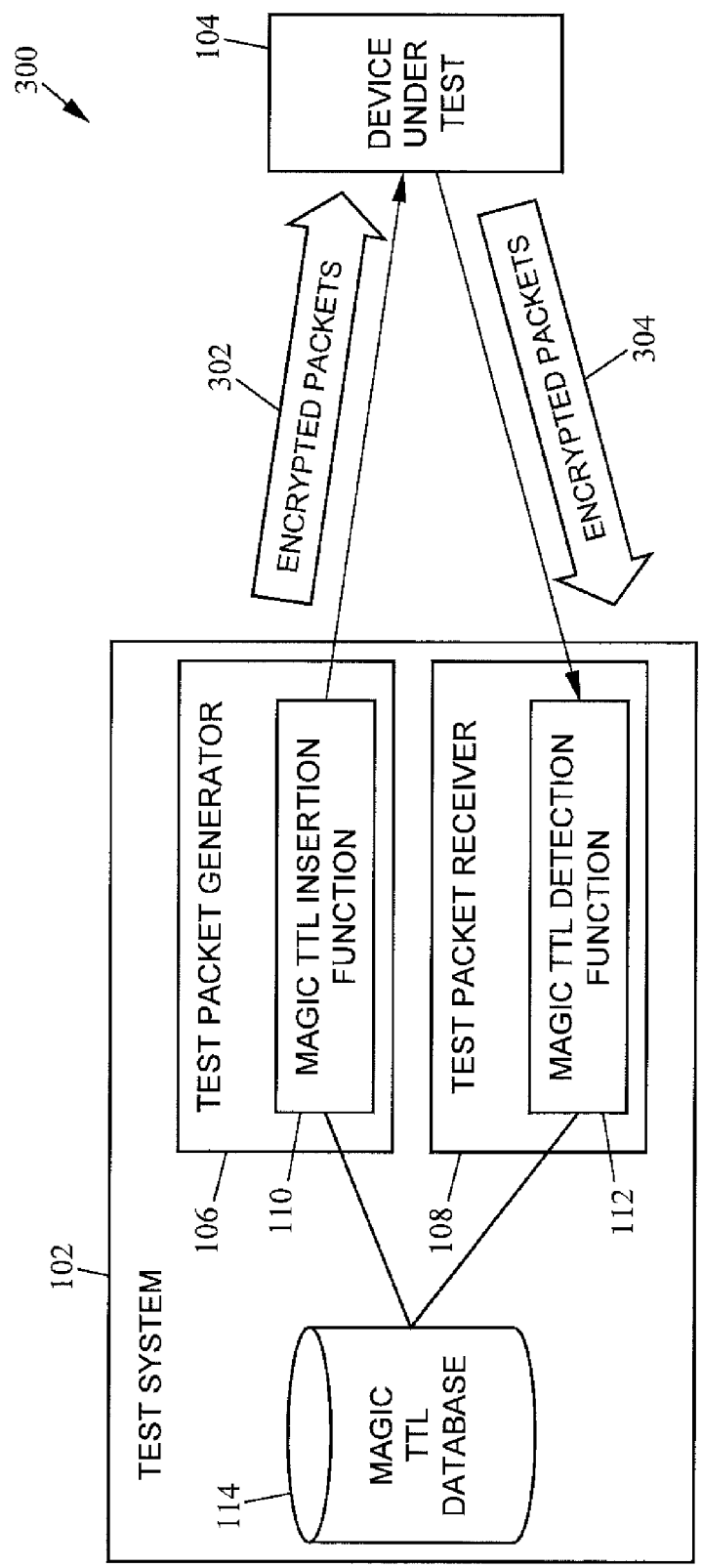
FIG. 3 is a block diagram of an exemplary testing environment for selectively processing encrypted packets using time to live (TTL) information according to an embodiment of the subject matter described herein.

FIG. 3 illustrates a block diagram of an exemplary testing environment for selectively processing encrypted packets using TTL information according to an embodiment of the subject matter described herein. In one embodiment, test system 102 utilizes test packet generator 106 to generate a test packet. Test packet generator 106 may utilize a magic TTL insertion function 110 to insert one or more magic TTL values in a test packet. For example, test packet generator 106 may query a magic TTL database 114 to obtain a predefined magic TTL value that is recognized and/or detected by test system 102.

In some embodiments, magic TTL database 114 may also be configured to include entries of predefined magic TTL values or magic TTL value intervals (i.e., a range of magic TTL values) that can be used by test system 102 to identify whether a received incoming packet contains an acceptable magic TTL value. For example, upon receiving a packet from DUT 104, test packet receiver 108 may utilize a magic TTL detection function 112 to process the packet. In some embodiments, after the received packet is decrypted by test packet receiver 108 (or DUT 104), magic TTL detection function 112 may inspect an inner packet header portion in the received test packet for the TTL value included in the TTL parameter field. Upon locating the contained TTL value, magic TTL detection function 112 may use the TTL value to query database 114. If the TTL value matches a magic TTL value or falls within any predefined magic TTL interval (or filter) specified in an entry of database 114, the TTL value is determined to be a magic TTL value and the associated test packet may be designated for further processing. In one embodiment, database 114 may include a plurality of magic TTL intervals or filters that are respectively mapped to various packet processing tasks that may be performed by test system 102. If the TTL value does not match any magic TTL entries in database 114, the TTL value is determined to be a normal TTL value and the packet proceeds in accordance with a default procedure (e.g., the test packet is counted and dropped).

Examples of additional processing that can be performed at test system 102 upon identifying a magic TTL value may include, but is not limited to, decrypting the test packet, classifying the test packet as a packet associated with either a "stateful" or "stateless" communication, classifying the test packet as a packet requiring payload content analysis, classifying the test packet as a packet that should be copied, classifying the test packet as a packet whose reception at the test system should be logged and/or recorded, classifying the test packet as a packet that should cause/trigger the generation of another test packet, and the like.

In one exemplary embodiment depicted in FIG. 3, the use of a magic TTL value enables test system 102 to implement selective decryption on received test packets. Specifically, if a magic TTL value is detected in the outer header of an encrypted test packet, the encrypted test packet will be decrypted by test system 102. For example, test system 102 may be configured to receive the test packet (or a copy of the test packet) using test packet receiver 108. Magic TTL detection function 112 in test packet receiver 108 may be configured to examine the TTL parameter value contained in the received test packet. In one embodiment, magic TTL detection function 112 may use the TTL value contained in the outer IP header of the received encrypted test packet to query entries or filters in database 114 to determine if the TTL value matches a magic TTL value or falls within at least one magic TTL interval. If a match is found, then the TTL value is determined to be a magic TTL value. If the TTL parameter value contained in the test packet is identified by magic TTL detection function 112 as being a magic TTL value, then the test packet may be subjected to additional processing by test system 102. In one embodiment, the type of additional processing is mapped to the magic TTL interval (or filter) contained in database 114.

One reason for decrypting a test packet in system 300 may arise with the simulation and testing of bidirectional stateless traffic involving a dynamic control plane. Decryption of certain test packets belonging to bidirectional traffic is necessary when a sending entity (e.g., test packet generator 106) includes dynamic IP addresses and a receiving entity (e.g., test packet receiver 108) has a static IP address. Notably, if the sending entity has a dynamic IP address then a receiving entity needs to decrypt the IP packets to determine a return IP address of the sending entity if a response is to be made. Thus, test system 102 may be configured to decrypt certain received packets in order to test and simulate this scenario.

Another reason for decrypting a received test packet may include the calculation of test packet latency. In such a scenario, certain test packets may need to be decrypted for latency determination purposes. For example, a test packet may include a time stamp indicator upon creation by test packet generator 106. In many instances, the time stamp is placed in a field or portion of the test packet that is ultimately encrypted by test packet generator 106. Thus, the test packet needs to be decrypted in order for test packet receiver 108 to access the time stamp and calculate a latency value associated with the test packet.

Figure 4:
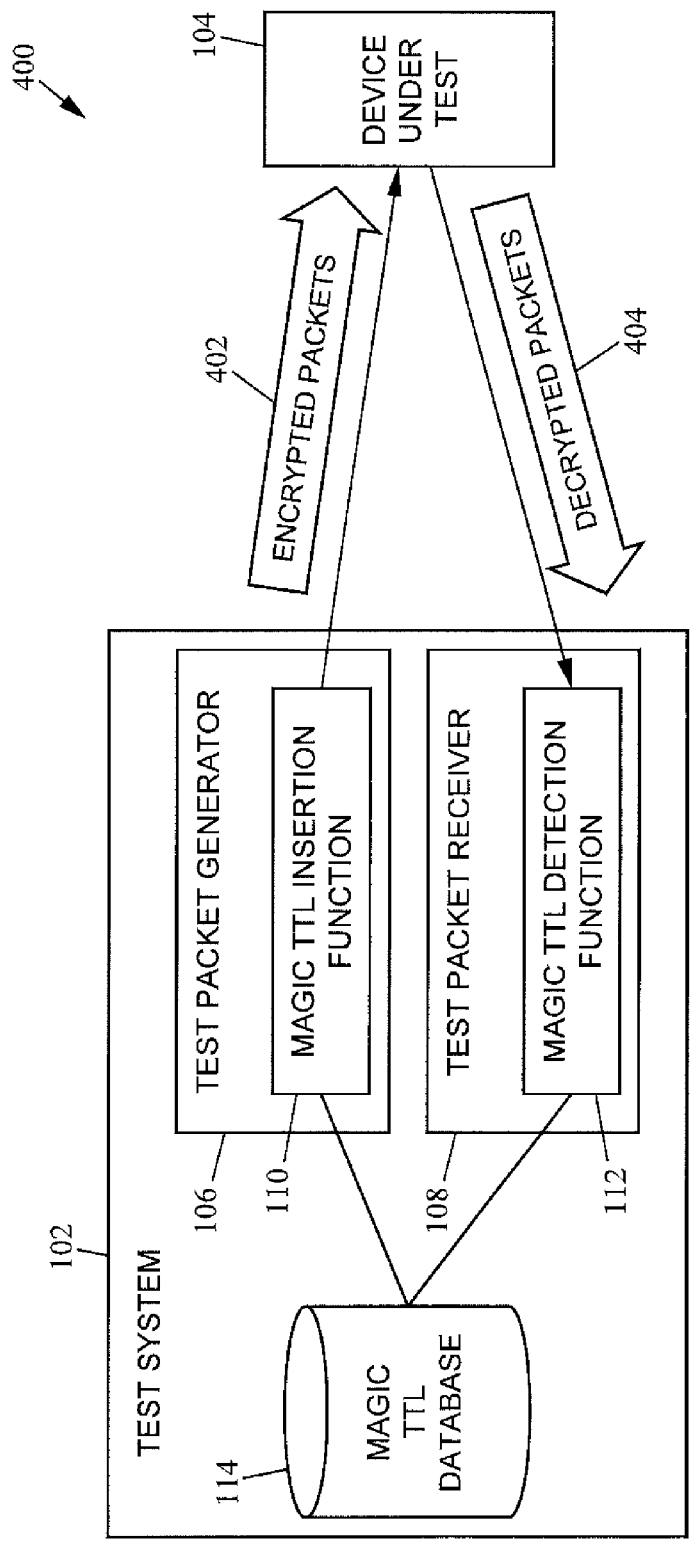
FIG. 4 is a block diagram of an exemplary testing environment for selectively processing decrypted packets using time to live (TTL) information according to an embodiment of the subject matter described herein.

FIG. 4 illustrates a block diagram of an exemplary testing environment for selectively processing decrypted packets using TTL information according to an embodiment of the subject matter described herein. In one embodiment, test traffic generator 106 may utilize magic TTL insertion function 110 to insert one or more magic TTL values into a test packet. Test packet generator 106 may then be configured to encapsulate and encrypt the test packet containing the magic TTL value prior to transmission (e.g., via packet flow 402) to DUT 104. In the embodiment depicted in FIG. 4, the headers of the encrypted inner packet and the outer encapsulating packet are assigned a magic TTL value. In some embodiments, the inner IP header and the outer IP header of the test packet may be assigned the same magic TTL value. Inclusion of the magic TTL value in both headers is beneficial in case a receiving DUT decrypts and strips away the outer IP header the test packet. After generating the test packet including the one or more magic TTL values, test packet generator 106 may send the encrypted test packet to DUT 104 via packet flow 402.

After receiving the encrypted packet via flow 402, DUT 104 may be configured to decrypt the encrypted packet and strip the encapsulating (i.e., outer) packet header. DUT 104 may, in some cases, modify or corrupt the contents of the decrypted test packet. In test scenarios involving encapsulation and/or tunneling, it is possible for the encapsulated test packet and/or the encapsulating test packet to be modified or corrupted. DUT 104 may also be configured to forward the decrypted packet (e.g., via packet flow 404 in FIG. 4) to test packet receiver 108. Upon receiving packet flow 404, test packet receiver 108 may examine the decrypted test packet and detect the magic TTL value in the original inner packet header. For example, test packet receiver 108 may utilize magic TTL detection function 112 to conduct a comparison of the TTL parameter value contained in the test packet with magic TTL values and/or value intervals stored in database 114. If the TTL parameter value contained in the test packet is identified by magic TTL detection function 112 as being a magic TTL value, then the test packet may be subject to additional processing (as mentioned above) by test system 102.

Figure 5:
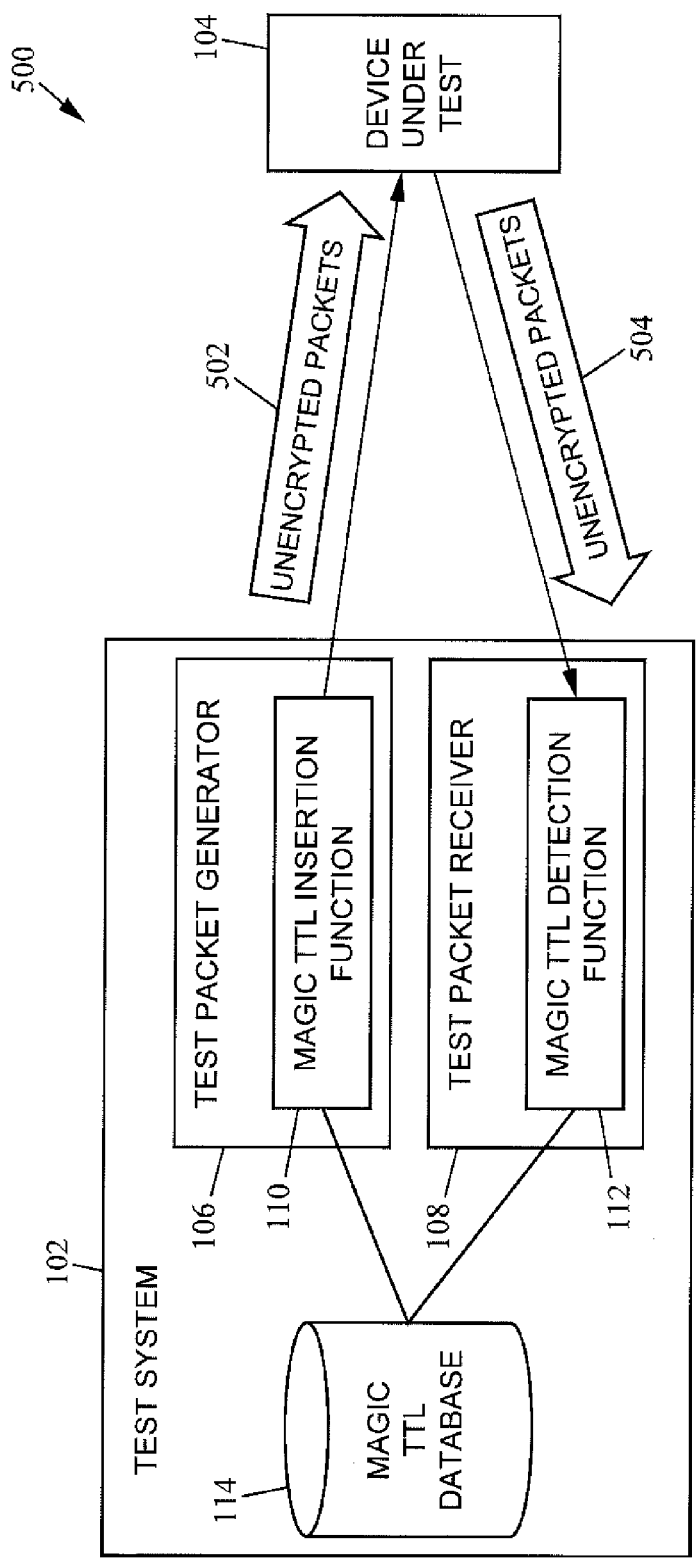
FIG. 5 is a block diagram of an exemplary testing environment for selectively processing unencrypted packets using time to live (TTL) information according to an embodiment of the subject matter described herein.

FIG. 5 illustrates a block diagram of an exemplary testing environment for selectively processing unencrypted packets using time to live (TTL) information according to an embodiment of the subject matter described herein. In one embodiment, test traffic generator 106 may utilize insertion function 110 to insert a magic TTL value into a test packet that is not encrypted prior to transmission to DUT 104. The unencrypted test packet is routed to DUT 104 via an unencrypted packet flow 502. Upon receiving the unencrypted packet containing a magic TTL value, DUT 104 may be configured to process the test packet in some manner (e.g., modify the unencrypted packet). DUT 104 may then return the unencrypted packet to test system 102 via unencrypted packet flow 504. Upon receiving a test packet, test packet receiver 108 may be configured to examine the unencrypted test packet in an attempt to detect an included magic TTL value. For example, test packet receiver 108 may utilize magic TTL detection function 112 to conduct a comparison of the TTL parameter value contained in the unencrypted test packet with magic TTL values and/or value intervals stored in database 114. If the TTL parameter value contained in the test packet is identified by test system 102 as being a magic TTL value, then the test packet may be subject to additional processing (as mentioned above) by test system 102. An example of packet processing conducted on unencrypted packets may involve packet filtering or categorizing.

Figure 6:
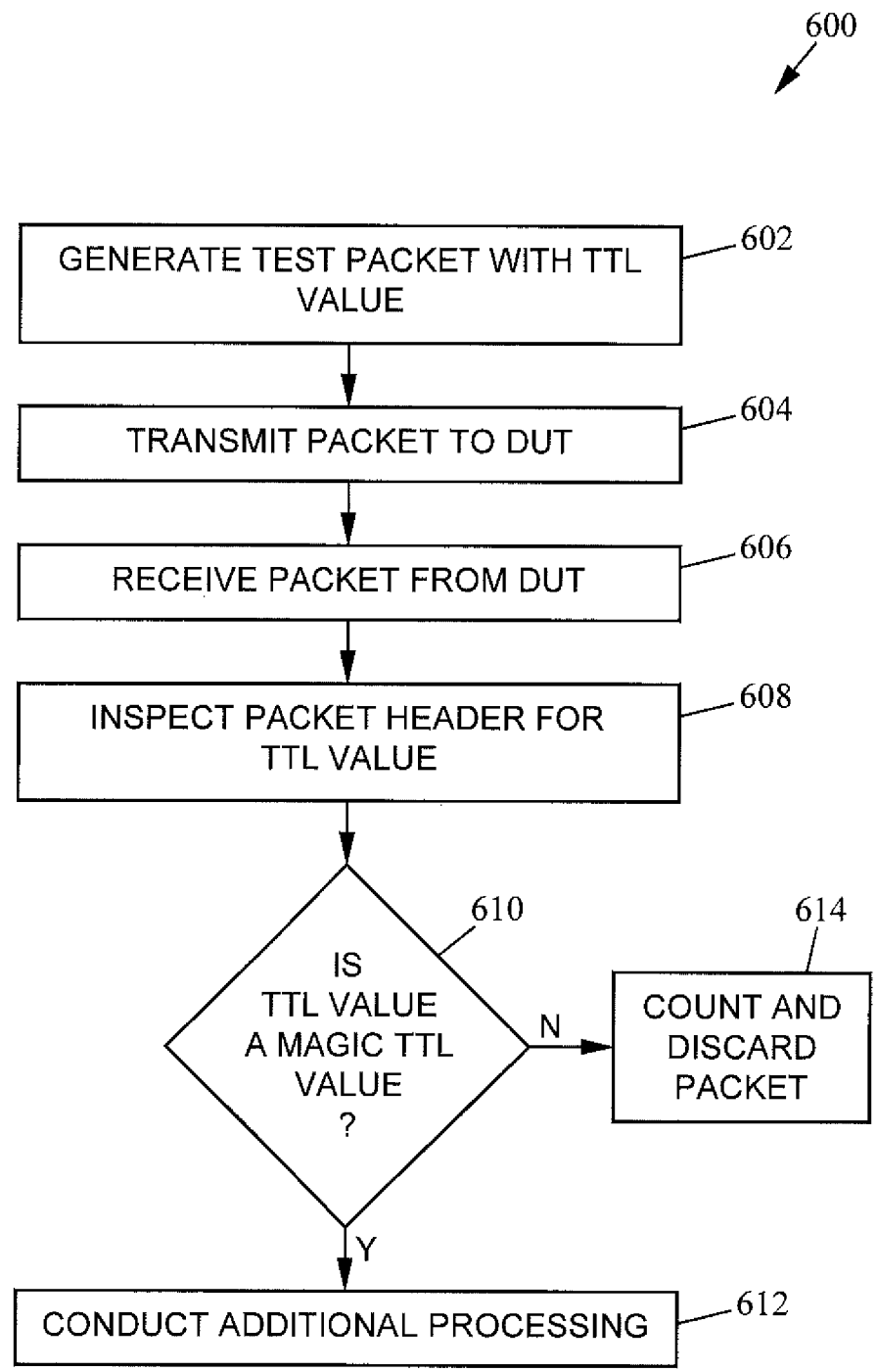
FIG. 6 is a flow chart illustrating exemplary overall steps for selectively processing packets using time to live (TTL) information according to an embodiment of the subject matter described herein.

FIG. 6 is a flow chart illustrating an exemplary method 600 including overall steps for selectively processing packets using TTL information according to an embodiment of the subject matter described herein. In step 602, a test packet with an assigned TTL value is constructed. In one embodiment, a test packet generator in a test system may generate a test packet to be transmitted to a DUT. The test packet generator may, in certain instances, insert a magic TTL value in the TTL parameter field of the test packet. In some embodiments, the test packet generator may also encrypt and/or encapsulate the test packet using, for example, ESP protocol.

In step 604, the test packet is transmitted to a device under test. In one embodiment, the test system transmits the generated test packet toward the device under test as a part of a packet flow.

In step 606, the test packet is received from the DUT. In one embodiment, the DUT (after receiving and optionally processing the test packet) sends the test packet to a test packet receiver of the test system. In some embodiments, the test packet may be received by the test packet receiver in an encrypted, decrypted, or unencrypted form.

In step 608, the packet header of the test packet is inspected for a TTL value. In one embodiment, the test packet receiver may utilize a magic TTL detection function to inspect the TTL parameter field of the received test packet to locate the included TTL value.

In step 610, a determination is made as to whether the TTL value is a magic TTL interval. In one embodiment, the test packet receiver may utilize a magic TTL detection function to determine if the TTL value contained in a packet header of the received test packet is a magic TTL value. For example, the test packet receiver may use the TTL value in the received test packet to query a magic TTL database to determine if the TTL value matches a specific magic TTL value or falls within a predefined magic TTL interval/range. If either is true, then the TTL value in the received packet is identified as a magic TTL value. If a match is detected in step 610, then method 600 continues to step 612 where additional processing (e.g., decryption, filtering, etc.) may be conducted on the test packet. Otherwise, method 600 proceeds to block 614 where the test packet is counted and subsequently discarded.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for selectively processing packets using time to live (TTL) information, the method comprising:
generating, by a test system machine, a test packet that includes a TTL parameter field containing a TTL value;
sending, by the test system machine, the test packet to a device under test (DUT);
receiving, by the test system machine, the test packet from the DUT;
determining if the TTL value in the test packet is a magic TTL value, wherein the magic TTL value includes a predefined value that is mapped to a processing task that is performed by the test system machine; and
performing the processing task on the test packet if the test packet includes the magic TTL value.

2. The method of claim 1 wherein the processing task includes at least one of: decrypting the test packet, filtering the test packet, classifying the test packet as a stateful communication packet or a stateless communication packet, conducting a payload content analysis on the test packet, generating a copy of the test packet, logging the test packet, and triggering the generation of another test packet.

3. The method of claim 2 wherein decrypting the test packet includes decrypting the test packet to access a time stamp identifier to be used to calculate latency of the test packet.

4. The method of claim 2 wherein decrypting the test packet includes decrypting the test packet to obtain an Internet protocol (IP) address of an originating entity of the test packet, wherein the IP address is one of a plurality of dynamic IP addresses utilized by the originating entity.

5. The method of claim 1 wherein determining if the TTL value in the test packet is a magic TTL value includes using the TTL value to query a magic TTL database associated with the test system machine and determining if the TTL value matches an entry in the magic TTL database.

6. The method of claim 5 wherein determining if the TTL value matches an entry includes determining if the TTL value matches a magic TTL value or a range of magic TTL values contained in the magic TTL database.

7. The method of claim 1 wherein determining if the TTL value in the test packet is a magic TTL value includes accessing an inner IP header of the test packet to obtain the TTL value.

8. The method of claim 1 wherein the device under test includes at least one of: an evolved packet system (EPS) network element, a network switch, a network router, an application server (AS), a user equipment (UE) device, a data center node, a WiFi access point, a modems, a firewall, and a network address translation (NAT) routing device.

9. The method of claim 1 wherein the test packet includes at least one of: a user datagram protocol (UDP) packet, a transmission control protocol (TCP) packet, and an Internet protocol (IP) packet.

10. The method of claim 1 wherein the test packet is encapsulated using at least one of: an Encapsulating Security Payload (ESP) protocol, a Transport Layer Security (TLS) protocol, a Data TLS (DTLS) protocol, and a Secure Shell (SSH) protocol.

11. The method of claim 1 wherein the test packet is encrypted using at least one of: a GPRS tunneling protocol (GTP), a Point-to-Point Tunneling protocol (PPTP), a Layer Two Tunneling protocol (L2TP), a Secure Socket Tunneling protocol (SSTP), and a Generic Routing Encapsulation (GRE) protocol.

12. The method of claim 1 further comprising:
generating, at the test system machine, the test packet;
inserting the magic TTL value in the TTL parameter field of the test packet; and
sending the test packet to the DUT.

13. A test system for selectively processing packets using time to live (TTL) information, the system comprising:
a test packet generator in a test system machine for generating a test packet and for sending the test packet to a device under test (DUT), wherein the test packet includes a TTL parameter field containing a TTL value; and a test packet receiver in the test system machine for receiving the test packet from the DUT, for determining if the TTL value in the test packet is a magic TTL value, wherein the magic TTL value includes a predefined value that is mapped to a processing task that is performed by the test system machine, and for performing the processing task on the test packet if the test packet includes the magic TTL value.

14. The system of claim 13 wherein the additional processing task includes at least one of: decrypting the test packet, filtering the test packet, classifying the test packet as a stateful communication packet or a stateless communication packet, conducting a payload content analysis on the test packet, generating a copy of the test packet, logging the test packet, and triggering the generation of another test packet.

15. The system of claim 14 wherein the test packet receiver is configured for decrypting the test packet to access a time stamp identifier to be used to calculate latency of the test packet.

16. The system of claim 14 wherein the test packet receiver is configured for obtaining an Internet protocol (IP) address of an originating entity of the test packet, wherein the IP address is one of a plurality of dynamic IP addresses utilized by the originating entity.

17. The system of claim 13 wherein the test packet receiver is configured for using the TTL value to query a magic TTL database associated with the test system machine and determining if the TTL value matches an entry in the magic TTL database.

18. The system of claim 17 the test packet receiver is configured to determine if the TTL value matches a magic TTL value or a range of magic TTL values contained in the magic TTL database.

19. The system of claim 13 wherein the test packet receiver is configured for accessing an inner IP header of the test packet to obtain the TTL value.

20. The system of claim 13 wherein the device under test includes at least one of: an evolved packet system (EPS) network element, a network switch, a network router, an application server (AS), a user equipment (UE) device, a data center node, a WiFi access point, a modems, a firewall, and a network address translation (NAT) routing device.

21. The system of claim 13 wherein the test packet includes at least one of: a user datagram protocol (UDP) packet, a transmission control protocol (TCP) packet, and an Internet protocol (IP) packet.

22. The system of claim 13 wherein the test packet generator is configured for encapsulating the test packet using at least one of: an Encapsulating Security Payload (ESP) protocol, a Transport Layer Security (TLS) protocol, a Data TLS (DTLS) protocol, and a Secure Shell (SSH) protocol.

23. The system of claim 13 wherein the test packet generator is configured for encrypting the test packet using at least one of: a GPRS tunneling protocol (GTP), a Point-to-Point Tunneling protocol (PPTP), a Layer Two Tunneling protocol (L2TP), a Secure Socket Tunneling protocol (SSTP), and a Generic Routing Encapsulation (GRE) protocol.

24. The system of claim 13 wherein the test packet generator is configured for inserting the magic TTL value in the TTL parameter field of the test packet.

25. A non-transitory computer readable medium having stored computer executable instructions that when executed by a processor of a computer cause the computer to perform steps comprising:

generating, by a test system machine, a test packet that includes a TTL parameter field containing a TTL value;

sending, by the test system machine, the test packet to a device under test (DUT);

receiving, by the test system machine, the test packet from the DUT;

determining if the TTL value in the test packet is a magic TTL value, wherein the magic TTL value includes a predefined value that is mapped to a processing task that is performed by the test system machine; and performing the processing task on the test packet if the test packet includes the magic TTL value.

* * * * *